United States Patent
Carroll et al.

(10) Patent No.: US 6,443,121 B1
(45) Date of Patent: Sep. 3, 2002

(54) HYDRAULICALLY ACTUATED GAS EXCHANGE VALVE ASSEMBLY AND ENGINE USING SAME

(75) Inventors: Thomas S. Carroll, Peoria; Gregory O. Taylor, Hinsdale, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/606,286

(22) Filed: Jun. 29, 2000

(51) Int. Cl.⁷ ............................................... F02M 57/04
(52) U.S. Cl. .................... 123/296; 123/188.4; 123/507; 123/508; 123/90.12
(58) Field of Search .......................... 123/90.12, 90.24, 123/188.4, 296, 303, 79 R, 79 C, 470, 507, 508, 509, 446; 417/380

(56) References Cited

U.S. PATENT DOCUMENTS

| | | | |
|---|---|---|---|
| 2,044,522 A | | 6/1936 | Wurtele |
| 2,071,719 A | | 2/1937 | Wurtele |
| 2,072,437 A | | 3/1937 | Wurtele |
| 2,082,853 A | | 6/1937 | Stoikowitz |
| 2,171,668 A | | 9/1939 | Oldham |
| 2,191,333 A | | 2/1940 | Willgoos |
| 2,280,386 A | | 4/1942 | Dickson |
| 2,595,775 A | | 5/1952 | Wrangell |
| 2,650,579 A | | 9/1953 | Bernight |
| 2,935,979 A | | 5/1960 | Havens |
| 3,812,829 A | * | 5/1974 | McCormick ............ 123/32 VN |
| 4,020,803 A | | 5/1977 | Thuren et al. |
| 4,058,091 A | * | 11/1977 | Tanahashi ............... 123/32 VN |
| 4,169,488 A | | 10/1979 | Goloff et al. |
| 4,653,726 A | | 3/1987 | Lang et al. |
| 4,674,450 A | | 6/1987 | Krajancich |
| 4,809,655 A | | 3/1989 | Mahler |
| 5,168,843 A | | 12/1992 | Franks |
| 5,596,964 A | | 1/1997 | Kurihara |
| 5,619,961 A | | 4/1997 | Diggs |
| 5,638,781 A | | 6/1997 | Sturman |
| 5,682,846 A | | 11/1997 | Scharnweber |
| 5,709,178 A | | 1/1998 | Feucht |
| 5,713,315 A | | 2/1998 | Jyoutaki et al. |
| 5,713,316 A | | 2/1998 | Sturman |

FOREIGN PATENT DOCUMENTS

| | | | | |
|---|---|---|---|---|
| DE | 4110010 A1 | * | 10/1992 | ................. 123/508 |
| DE | 41 10 010 A1 | | 10/1992 | |
| GB | 2145153 A | * | 3/1985 | ................. 123/470 |

* cited by examiner

*Primary Examiner*—Thomas Denion
*Assistant Examiner*—Jaime Corrigan
(74) *Attorney, Agent, or Firm*—Liell & McNeil

(57) ABSTRACT

An engine comprises a housing that defines a hollow piston cavity that is separated from a gas passage by a valve seat. The housing further defines a biasing hydraulic cavity and a control hydraulic cavity. A gas valve member is also included in the engine and is movable relative to the valve seat between an open position at which the hollow piston cavity is open to the gas passage and a closed position in which the hollow piston cavity is blocked from the gas passage. The gas valve member includes a ring mounted on a valve piece and a retainer positioned between the ring and the valve piece. A closing hydraulic surface is included on the gas valve member and is exposed to liquid pressure in the biasing hydraulic cavity.

20 Claims, 10 Drawing Sheets

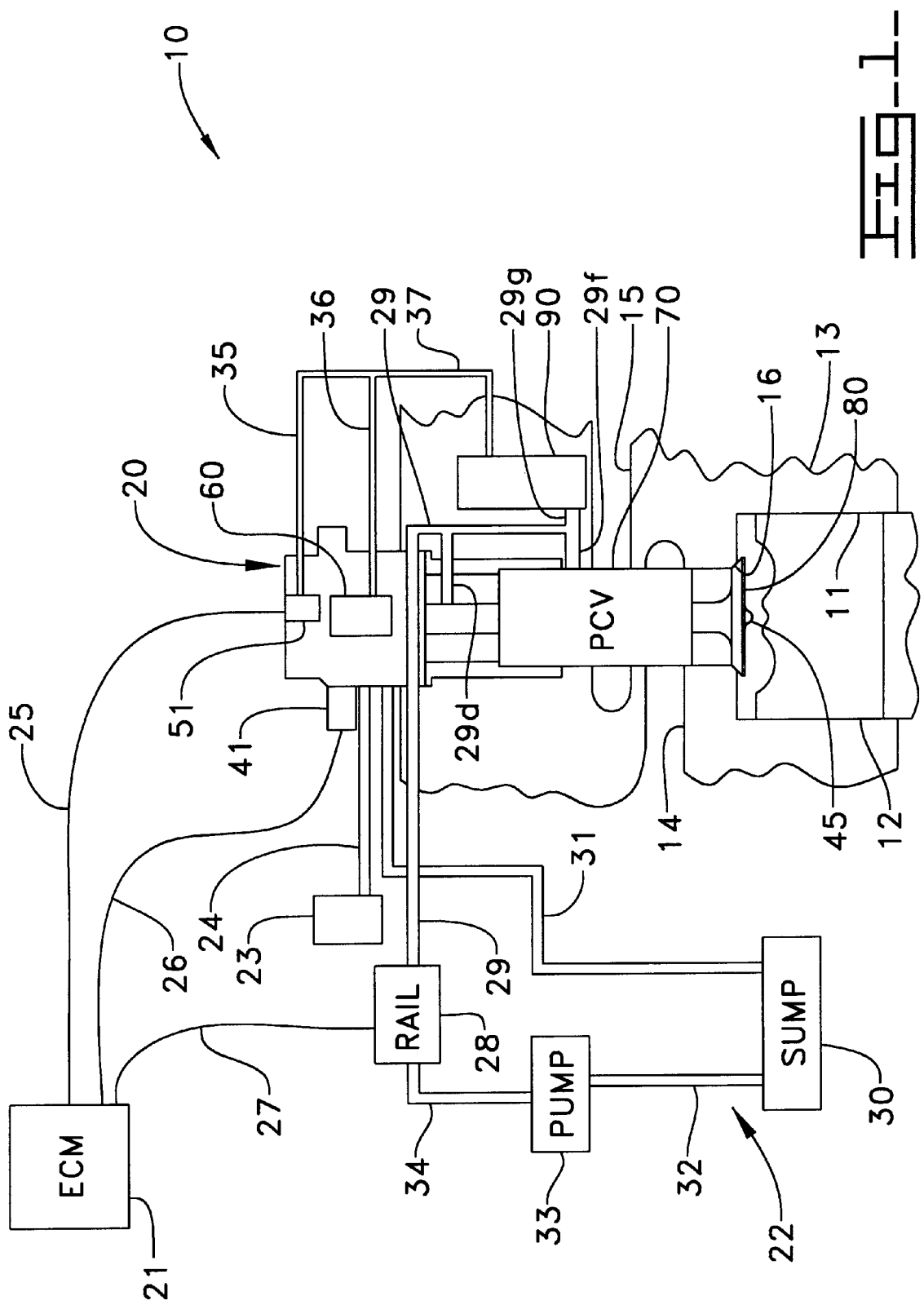

NEEDLE CONTROL BALL VALVE

MAIN CONTROL BALL VALVE

SPOOL VALVE POSITION

PCV PILOT VALVE POSITION

GAS VALVE MEMBER POSITION

PORT CONTROL VALVE

NEEDLE VALVE MEMBER

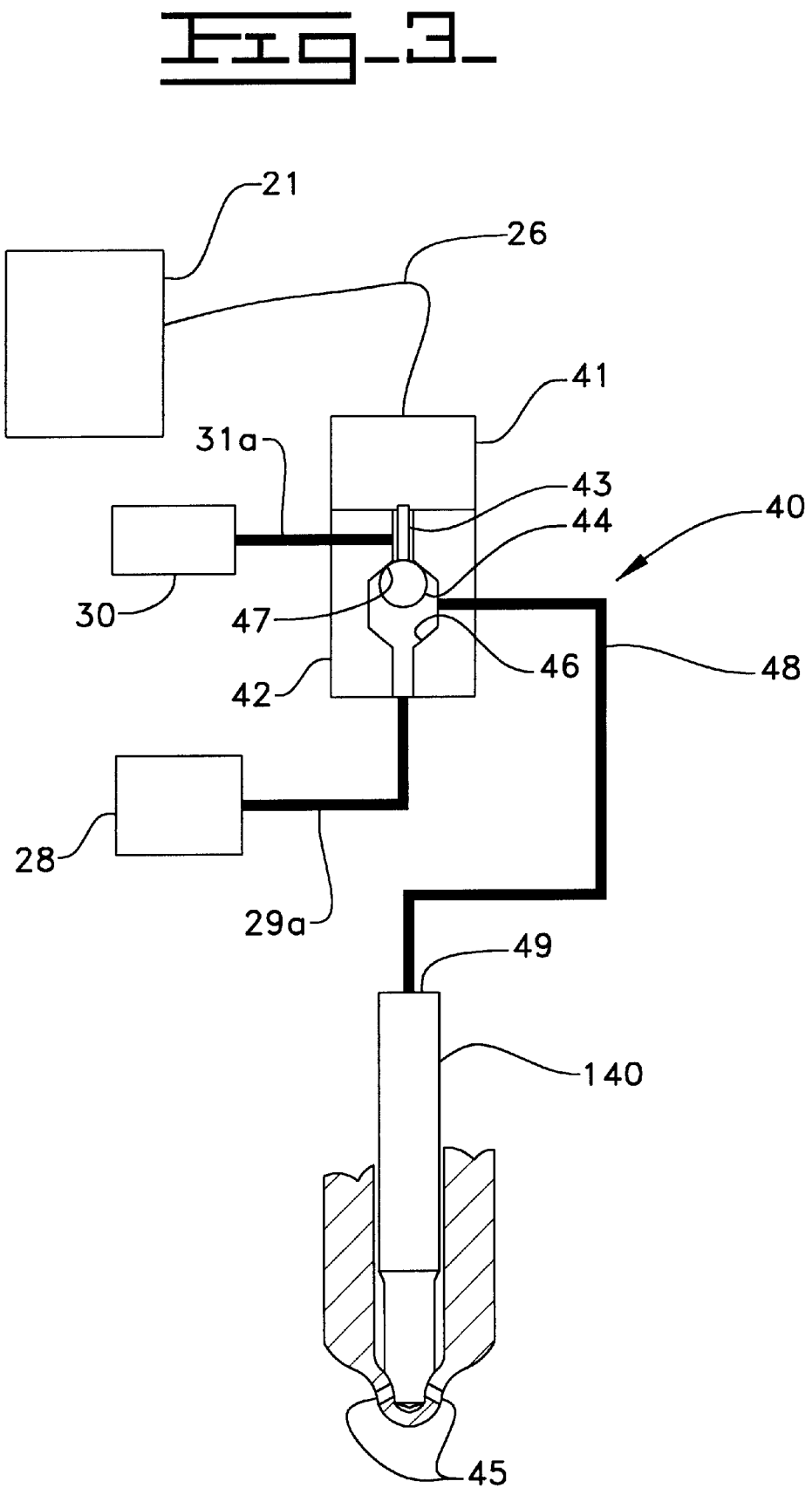
Fig_3_

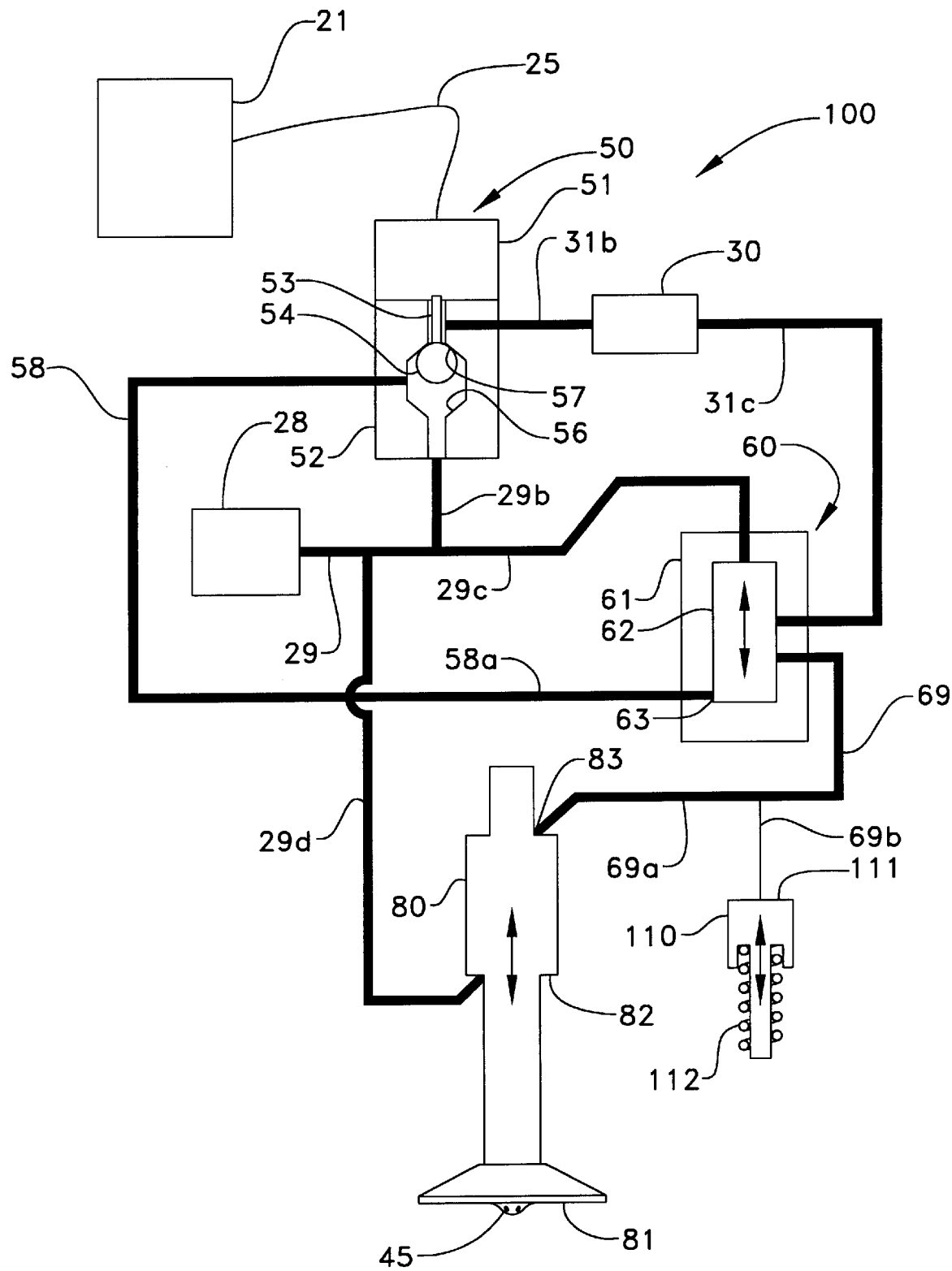
Fig_4

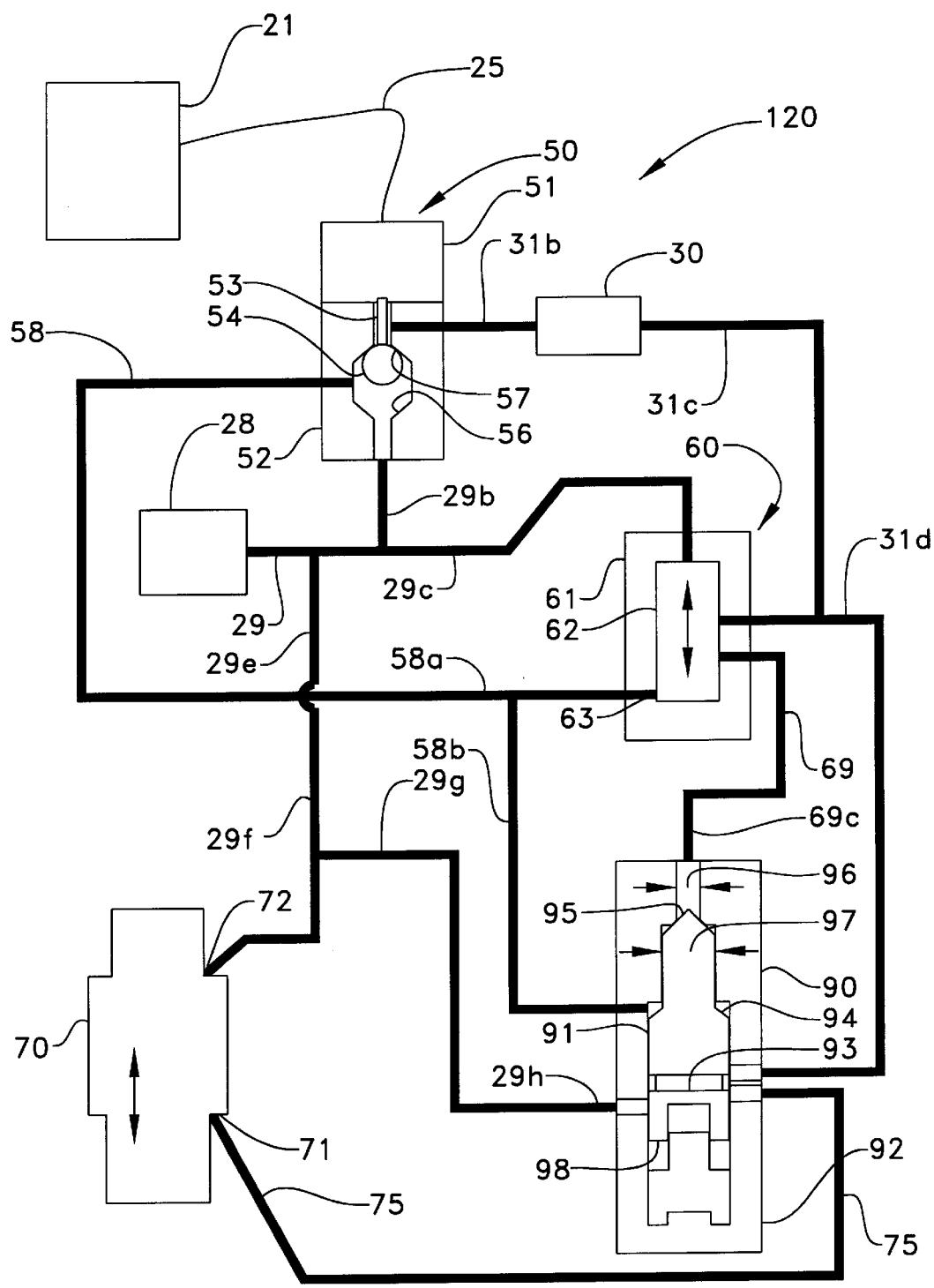
Fig_5_

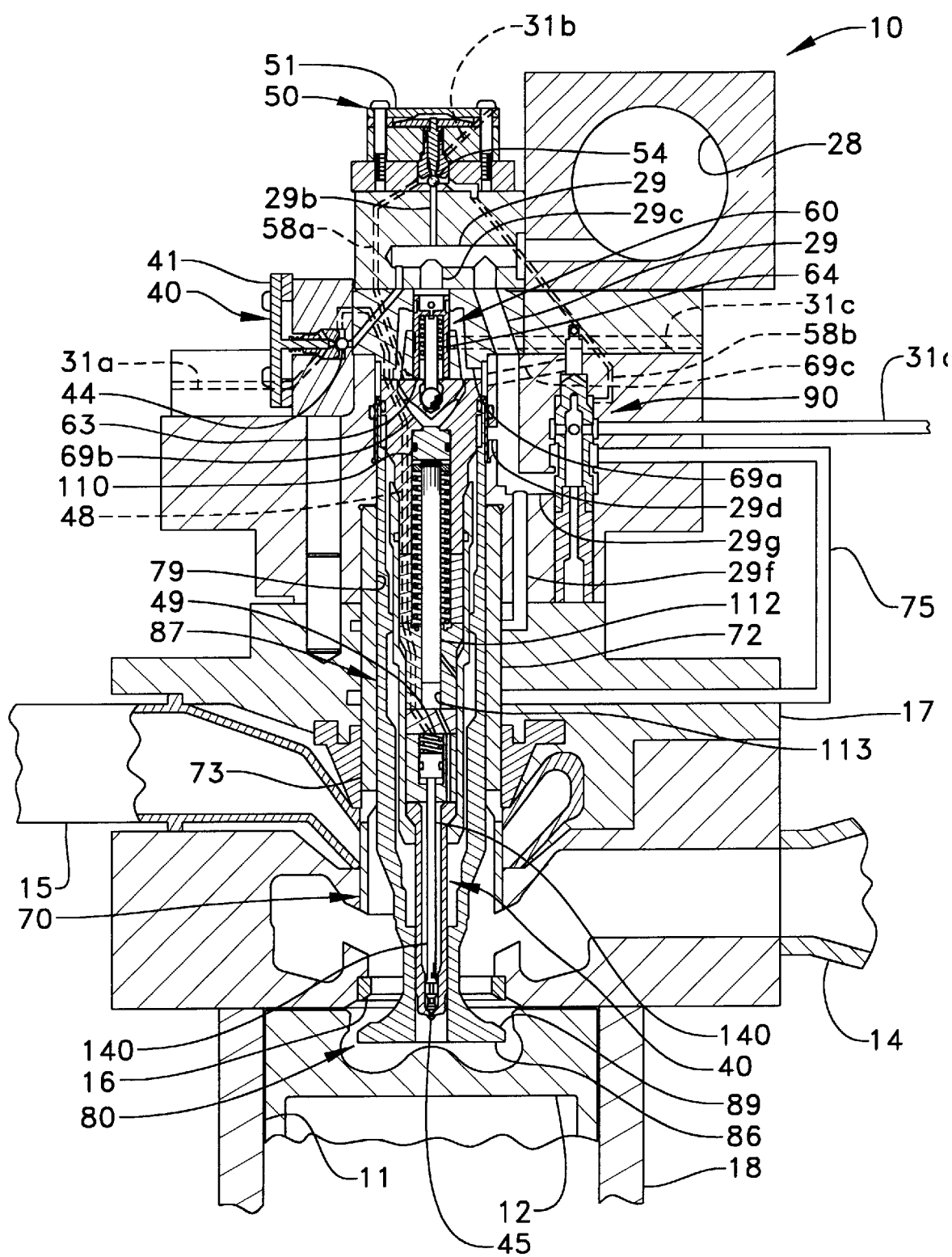
Fig_6_

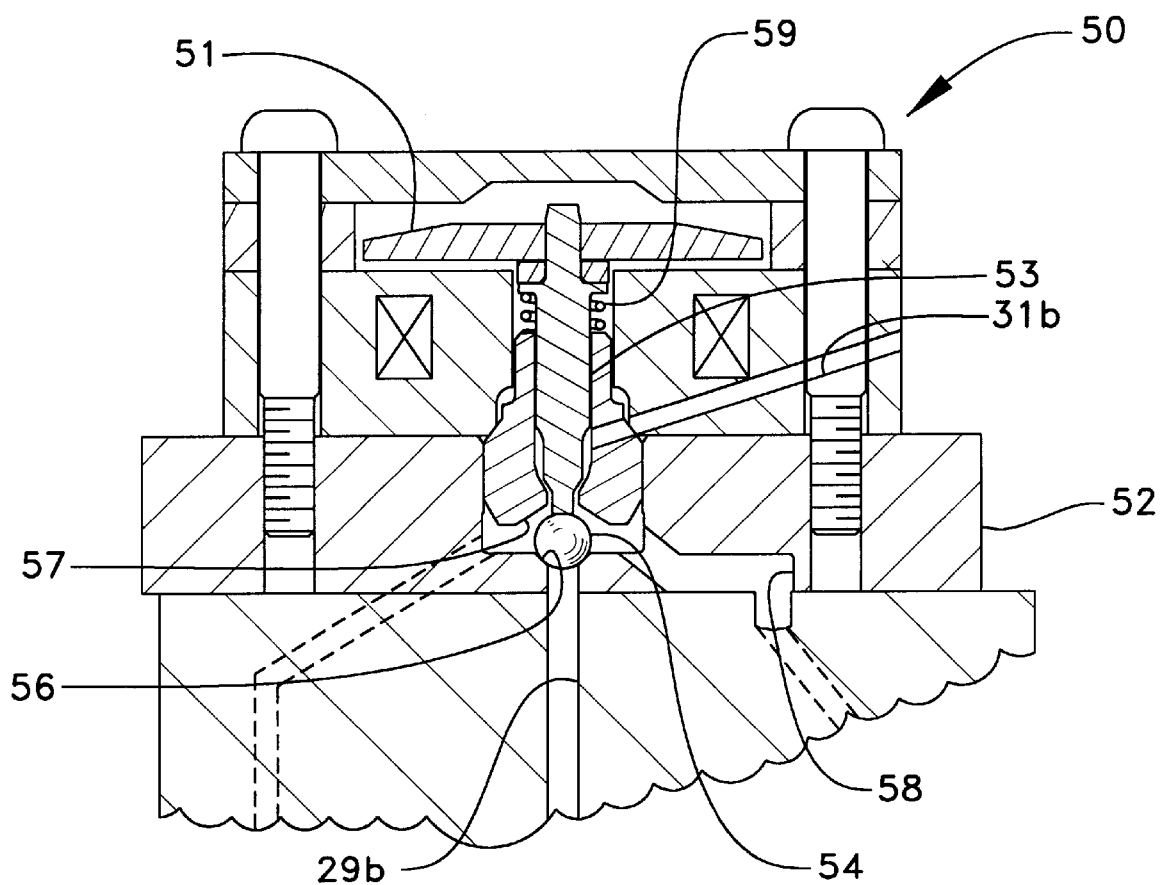

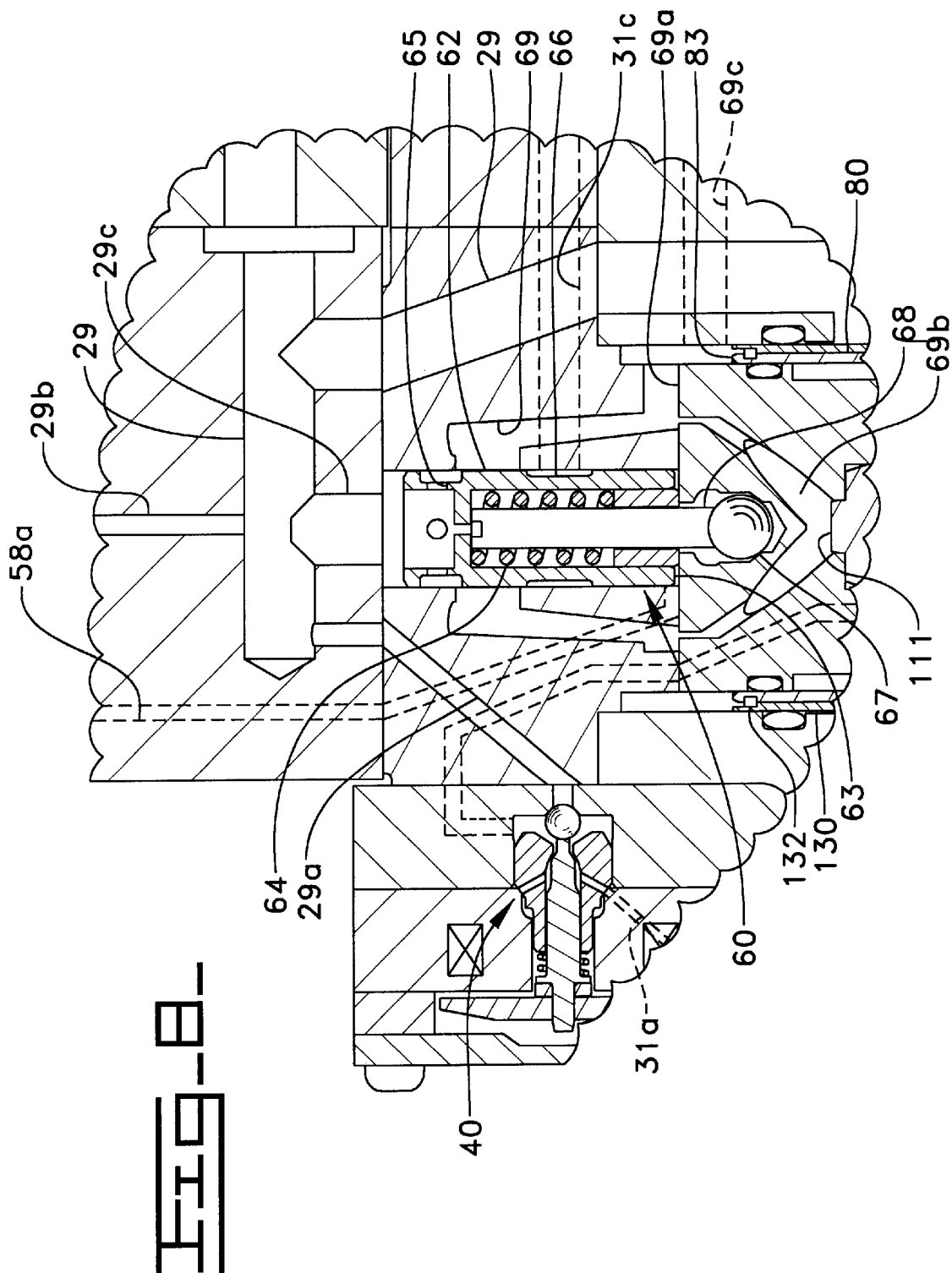

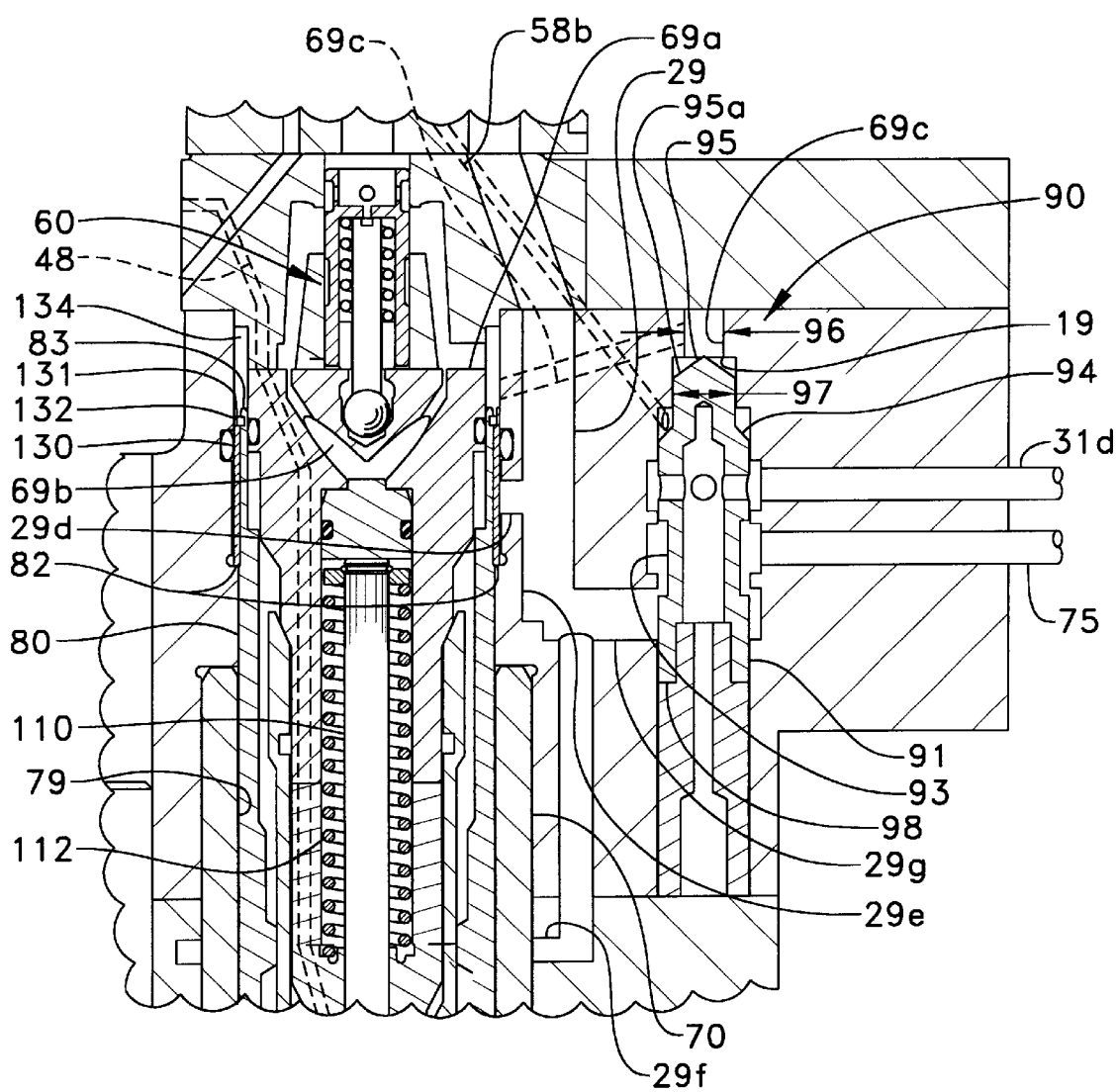
Fig_9

Fig_10_
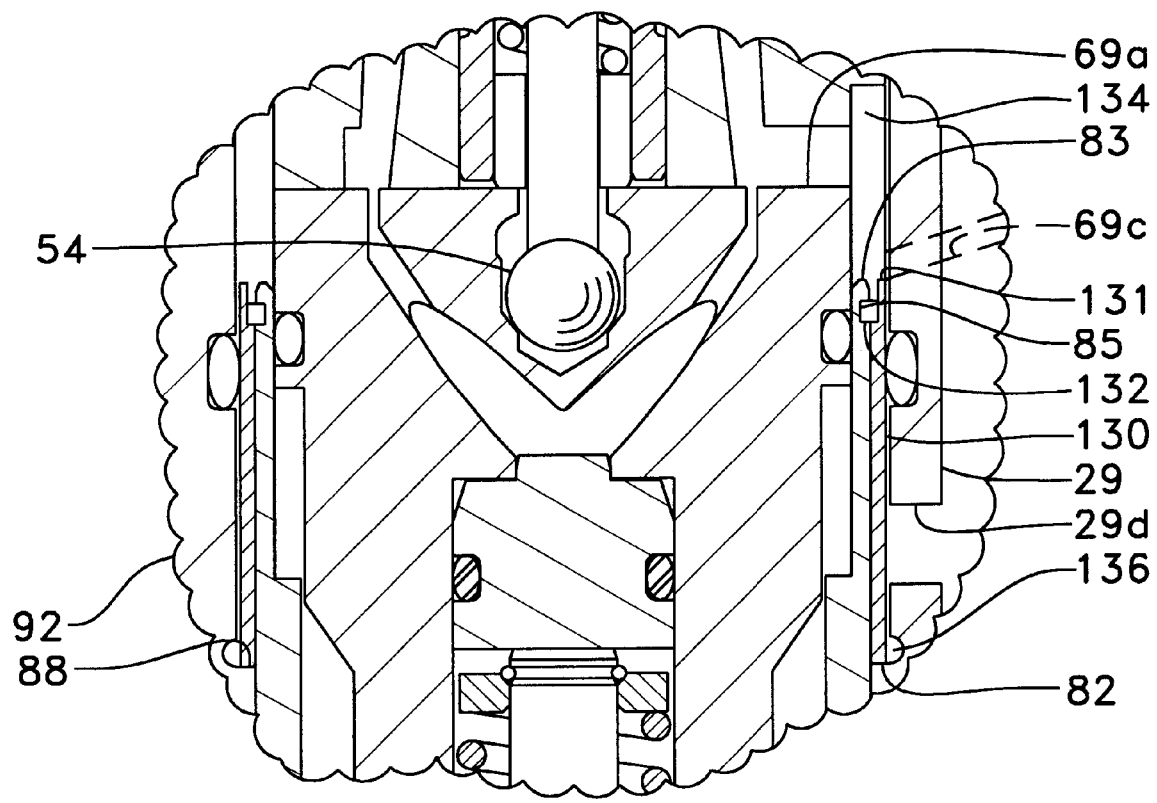

HYDRAULICALLY ACTUATED GAS EXCHANGE VALVE ASSEMBLY AND ENGINE USING SAME

The Government has the rights in this invention pursuant to Contract No. DE-FC05-97OR22605-RS96-006 awarded by the U.S. Department of Energy.

TECHNICAL FIELD

The present invention relates generally to gas exchange valve assemblies, and more particularly to a gas exchange valve assembly structure for a MonoValve engine.

BACKGROUND ART

Gas exchange valves, such as those included in MonoValve hydraulically actuated fuel injectors, are designed to include a relatively large diameter valve portion and a relatively large diameter stem portion positioned on either side of a smaller diameter segment. Because the smaller diameter segment is designed to be positioned in a bore with a diameter smaller than both the valve portion and the stem portion, a gas exchange valve composed of one piece having these characteristics cannot be assembled in a corresponding one piece valve body. Therefore, a gas exchange valve having these characteristics must be augmented to allow for assembly.

The present invention is directed to enabling assembly of valve members that require two large diameter portions to be positioned above and below a relatively small diameter portion in a valve body component.

SUMMARY OF THE INVENTION

In one aspect of the present invention, an engine comprises a housing that defines a hollow piston cavity that is separated from a gas passage by a valve seat. The housing further defines a biasing hydraulic cavity and a control hydraulic cavity. A gas valve member is also included in the engine and is movable relative to the valve seat between an open position at which the hollow piston cavity is open to the gas passage and a closed position in which the hollow piston cavity is blocked from the gas passage. The gas valve member includes a ring mounted on a valve piece and a retainer positioned between the ring and the valve piece. A closing hydraulic surface is included on the gas valve member and is exposed to liquid pressure in the biasing hydraulic cavity. Also included on the gas valve member is an opening hydraulic surface which is exposed to liquid pressure in the control hydraulic cavity. The opening hydraulic surface has a larger effective area than the closing hydraulic surface.

In another aspect of the present invention, a gas exchange valve for an engine comprises a hollow valve piece that has a stem portion and a valve portion. The valve portion defines a nozzle outlet and includes an annular valve surface. A ring is mounted around, and in contact with, the stem portion. A retainer is positioned between the stem portion and the ring.

In yet another aspect of the present invention, a monovalve fuel injector comprises an injector body that includes a hollow valve piece which has a stem portion and a valve portion. The valve portion defines a nozzle outlet and includes an annular valve surface. A ring is mounted around, and in contact with, the stem portion. A retainer is positioned between the stem portion and the ring. A pumping element is at least partially positioned inside the hollow valve piece and includes opposing hydraulic surfaces.

BRIEF DESCRIPTION OF THE DRAWINGS

FIG. 1 is a schematic view of an engine and valving system according to one aspect of the present invention.

FIG. 3 is a schematic view of a direct control needle valve according to one aspect of the present invention.

FIG. 4 is a schematic view of a fuel pressurization and gas exchange valving system according to one aspect of the present invention.

FIG. 5 is a schematic view of a port control valve system according to one aspect of the present invention.

FIG. 6 is a diagrammatic sectioned side view of a MonoValve with integrated fuel injector and port control valve mounted in an engine according to another aspect of the present invention.

FIG. 7 is an enlarged sectioned diagrammatic view of a ball valve according to one aspect of the present invention.

FIG. 8 is an enlarged diagrammatic sectioned view of a spool flow control valve according to another aspect of the present invention.

FIG. 9 is an enlarged sectioned diagrammatic view of a port control pilot valve according to still another aspect of the present invention.

FIG. 10 is an enlarged sectioned diagrammatic view of an end portion of the gas valve member of according to the preferred embodiment of the present invention.

BEST MODE OF CARRYING OUT THE INVENTION

Figure 2A:
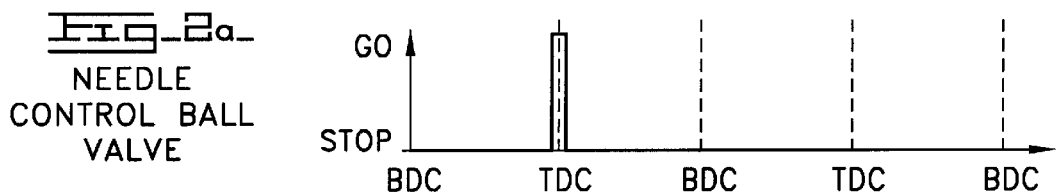
FIGS. 2a–g show various parameters including needle control ball valve position, main control ball valve position, spool valve position, PCV pilot valve position, gas valve member position, port control valve position, and needle valve member position, respectively, versus piston position for a single engine cycle according to one example aspect of the present invention.

Referring now to FIG. 1, engine 10 has a casing 13 that defines a hollow piston cavity 11 within which a piston 12 reciprocates in a conventional manner between a top dead center (TDC) position and a bottom dead center (BDC) position. Hollow piston cavity 11 is separated from an intake passage 14 and an exhaust passage 15 by a valve seat 16 and a gas exchange valve member 80. A MonoValve fuel injector 20 is mounted in engine casing 13 and centered above hollow piston cavity 11. MonoValve fuel injector 20 includes a gas valve member 80 that is positioned adjacent valve seat 16 and is moveable between an open position and a closed position, as shown. Gas valve member 80 defines a central opening that receives a tip defining a fuel injector nozzle outlet 45 that opens directly into hollow piston cavity 11. The fuel injector tip could be considered part of gas exchange valve 80 since it partially blocks the gas exchange port. Those skilled in the art will also realize that equivalent nozzle/gas exchange valve structures shown in U.S. Pat. Nos. 5,934,245 and 5,957,106 are also contemplated for the present invention. MonoValve fuel injector 20 also includes a port control valve 70 that is mounted around a portion of gas valve member 80 and is moveable between an intake position and an exhaust position, as shown. Thus, MonoValve fuel injector 20 performs three (3) different functions: fuel injection; opening and closing of the gas valve member for the exchange of intake and exhaust gases; and, control over which of the exhaust or intake passages is open at any given time.

The various sub-systems of MonoValve fuel injector 20 are hydraulically actuated using an available fluid raised to a relatively high working pressure, such as pressurized engine lubricating oil. The actuation fluid system 22 includes a low pressure reservoir 30, such as an oil pan, and a high pressure actuation fluid reservoir 28. A high pressure pump 33 draws low pressure oil from reservoir 30 via a pump supply line 32 and delivers relatively high pressure oil to high pressure reservoir 28 via a pump outlet line 34. A high pressure supply line 29 leads from high pressure reservoir 28 into MonoValve fuel injector 20 and branches off into various passages 29a–h to hydraulically bias certain components to certain positions and to provide a source of high pressure fluid to perform the various functions of the overall system. In FIG. 1, high pressure supply line 29 is shown branching off into a biasing line 29d that hydraulically biases gas valve member 80, which is discussed in detail infra, to its upward closed position as shown. Another high pressure biasing line 29f acts to hydraulically bias port control valve member 70 toward an downward exhaust position. Still another high pressure biasing line 29h serves to bias a port control pilot valve 90, which is discussed in detail infra, toward an upward position. After performing work within MonoValve fuel injector 20, low pressure oil is drained back to low pressure reservoir 30 via a drain passage 31 which includes multiple branches 31a–c. Fuel is supplied to MonoValve fuel injector 20 from a fuel tank 23 via a fuel supply passage 24 in a conventional manner.

The operation of MonoValve fuel injector 20 is controlled by a single electronic control module 21. The overall operation of MonoValve fuel injector 20 is controlled by a first electrical actuator 41, a second electrical actuator 51, and a pressure control device attached to high pressure reservoir 28. These various controllers are controlled by electronic control module 21 via communication control lines 26, 25, and 27, respectively. Those skilled in the art will appreciate that the speed and other aspects of the MonoValve fuel injector 20's performance can be controlled by the magnitude of the high pressure in high pressure reservoir 28. The first electrical actuator 41 controls a direct control needle valve system, which is described infra, and relates to the opening and closing of nozzle outlet 45. Finally, the movement of gas valve member 80, port control valve member 70, port control pilot valve 90, and spool flow control valve 60 are all operably coupled to the second electrical actuator 51. Depending upon the activation position of second electrical actuator 51, a control passage 58 (and branches 58a–b) is either connected to high pressure supply line 29 or low pressure drain passage 31. Control passage 58 is connected to a spool control branch passage 58a that controls the positioning of spool flow control valve 60, and branches in another direction to pilot control branch passage 58b, which controls the positioning of port control pilot valve member 90.

Referring now, in addition to FIGS. 3 and 6, the direct control needle system 40 aspect of the invention is illustrated. Direct control needle system 40 includes a first electrical actuator 41 that is attached to a valve body 42, which includes a ball valve member 44 trapped between a high pressure seat 46 and a low pressure seat 47. The passageway below pressure seat 46 is connected to the high pressure fluid reservoir 28 identified earlier via a high pressure supply line branch passage 29a. The area above low pressure seat 47 is connected to the previously identified low pressure reservoir 30 via a branch drain passage 31a. When electrical actuator 41 is deactivated, a biaser, such as a spring, biases a pin 43 to an upward position out of contact with ball valve member 44. When electronic control module 21 commands electrical actuator 41 to activate, pin 43 is moved downward into contact with ball valve member 44 and pushes the same into contact to close high pressure seat 46. A needle control passage 48 opens on one end into the area between high pressure seat 46 and low pressure seat 47, and on its other end to a needle control chamber in which a closing hydraulic surface 49 of needle valve member 140 is exposed to fluid pressure. In order to perform like a conventional direct control needle, the size of closing hydraulic surface 49 and the magnitude of the high pressure fluid are chosen such that needle valve member 140 will remain in a downward closed position blocking nozzle outlet 45 when electrical actuator 41 is de-energized such that ball valve member closes low pressure seat 47, as shown. When electrical actuator 41, which is preferably a solenoid but could be another suitable actuator, is activated, high pressure seat 46 is closed and closing hydraulic surface 49 of needle valve member 140 is exposed to low pressure. When in this position, needle valve member 140 preferably behaves like a conventional spring biased needle check. Thus, the various pressures and surface areas are chosen such that needle valve member 140 can be pushed downward to, or held in a closed position at anytime during an injection event, even when fuel pressures are relatively high within the system.

Referring now to specifically FIG. 4 and in addition, FIGS. 1, 6, 7 and 8, the fuel pressurization and gas exchange system 100 aspect of the present invention is illustrated. This portion of the MonoValve fuel injector 20 is controlled in its operation by a main control valve 50, which preferably has a structure substantially identical to the direct needle control valve previously described. In particular, main control valve 50 includes an electrical actuator 51, which is preferably a solenoid, that is connected to electronic control module 21 via a communication control line 25. Electrical actuator 51 is attached to a valve body 52 within which a ball valve member 54 is trapped between a high pressure seat 56 and a low pressure seat 57. When actuator 51 is de-energized, a pin 53 is biased via a spring 59 to an upward position out of contact with ball valve member 54, which is acted upon by high pressure to hydraulically push the same into the position shown in FIG. 4 to close low pressure seat 57. When electrical actuator 51 is energized, pin 53 drives ball valve member 54 downward to open low pressure seat 57 and close high pressure seat 56. A control pressure communication passage 58 opens on one end into the area between high pressure seat 56 and low pressure seat 57. Thus, when electrical actuator 51 is de-energized, as shown in FIG. 4, control passage 58 is connected to high pressure reservoir 28 via high pressure supply branch passage 29b. When solenoid 51 is energized, control passage 58 is connected to low pressure reservoir 30 via low pressure drain passage 31.

One branch 58a of control passage 58 exposes end hydraulic surface 63 of spool valve member 62 to the pressure within control passage 58. (See FIG. 8) This is the means by which main control valve 50 is operably coupled to the operation of spool flow control valve 60. Spool valve member 62 includes an opposite end that is always exposed to the high pressure existing in a branch 29c of high pressure supply line 29. Thus, when pressure in control passage 58a is low, the constant high pressure acting on the opposite end of spool valve member 62 urges the same downward against the action of biasing spring 64 to a position as shown in FIG. 8, where the branch 29c of high pressure supply line 29 is fluidly connected to actuation fluid flow passage 69 via radial passage 65. When the pressure in control passage 58a is high, spool valve member 62 preferably becomes hydraulically balanced such that biasing spring 64 urges the same upward to a position at which supply line 29c is blocked but actuation fluid flow passage 69 is connected to a branch drain passage 31c via an annulus 66. Flow control valve 60 also includes a pressure relief ball 67 and pressure relief pin 68 that are positioned within the valve body 61. A bottom surface of ball 67 is exposed to pressure in a branch 69b of actuation fluid flow passage 69 via a hidden passage that is not shown. This serves as the means by which secondary injection events are inhibited because these two components exploit the residual pressure in branch flow passage 69b at the end of an injection event to hasten the upward movement of spool valve member 62. As best seen in FIGS. 4 and 8, actuation fluid flow passage 69 has a first branch 69b that acts upon a hydraulic surface 111 of an intensifier piston 110, and a second branch 69a that acts upon an opening hydraulic surface 83, a majority of which is a surface of gas valve member 80.

As best seen in FIGS. 6 and 9, intensifier piston/plunger 110, which could also be referred to as a pressure intensifying pumping element, is the means by which fuel within a fuel pressurization chamber 113 is pressurized to injection pressure. This pressurization occurs during an injection event as intensifier piston 110 is hydraulically driven downward. Between injection events, a return spring 112 biases intensifier piston 110 to an upward retracted position in a conventional manner as shown. This fuel pressurization aspect of the present invention is very similar to features described in several previous patents owned by Caterpillar, Inc. of Peoria, Ill.

With regard to hollow gas valve member 80, and referring in addition to FIG. 10, it includes a valve portion 86 and a stem portion 87. Valve portion 86 defines a nozzle outlet and includes an annular valve surface 89 that can close valve seat 16 when gas valve member 80 is in its upward, biased position. A ring 130 is mounted around, and press fit in contact with, stem portion 87. A retainer 132 is positioned between stem portion 87 and ring 130 and is at least partially positioned in a groove 85 that is preferably defined by stem portion 87, but could be defined at least in part by ring 130. While retainer 132 is preferably a clip having a rectangular cross section, it should be appreciated that a clip having a circular cross section could also be used. Retainer 132 and ring 130 are utilized to facilitate assembly of gas valve member 80 into engine 10. To maintain proper sealing and operation of gas valve member 80, it is desirable to have a tight clearance area between valve body 92 and gas valve member 80 above a shoulder 88. However, as illustrated in FIG. 6, an inner diameter 79 of port control valve 70 is smaller than both valve portion 86 and an inner diameter of valve body 92 above shoulder 88. It should therefore be appreciated that gas valve member 80 cannot be installed into engine 10 and maintain the desired clearances unless it or the valve body 92 is composed of more than one component.

To accommodate installation of gas valve member 80, valve body 92 and cylinder head 17 act as a multi-component housing for gas valve member 80. Gas valve member 80 is installed in this housing in the following manner. Port control valve 70 is first slid into cylinder head 17 from above. After port control valve 70 is in place, valve body 92 is positioned on cylinder head 17. Gas valve member 80 is then inserted into port control valve 70 from beneath and clamped such that annular valve surface 89 closes valve seat 16. Ring 130 is then pressed around stem portion 87 and pushed downward such that a top surface 131 of ring 130 is positioned below groove 85. When ring 130 is in this position, groove 85 is preferably completely uncovered. Additionally, ring 130 should be press fit about gas valve member 80 to ensure proper sealing. Retainer 132 is then placed on gas valve member 80 and slid downward to seat in groove 85. Once retainer 132 is seated in groove 85, gas valve member 80 is unclamped to allow the same to advance into the valve body from above until retainer 132 is pinched by ring 130, which should bear against shoulder 88. Proper assembly will place a shear force on retainer 132 that will serve to keep ring 130 on gas valve member 80 when the same is opening for an intake stroke. Once gas valve member 80 has been assembled, MonoValve fuel injector 20 is installed from above and cylinder head 17 is attached to engine block 18. Finally the high pressure rail and other applicable fluid sources are attached to the assembly.

Returning now to operation of gas valve member 80, it is normally hydraulically biased upward toward a closed position by a continuous high fluid pressure force in branch supply line 29d acting upon a biasing hydraulic surface 82, which is oriented in opposition to opening hydraulic surface 83. While biasing hydraulic surface 82 has been illustrated as being substantially defined by ring 130, it should be appreciated that it could be defined by one or more of ring 130, retainer 132, or gas valve member 80. Of course, those skilled in the art will appreciate that some other biaser, such as a spring could be substituted for the hydraulic force acting on bias hydraulic surface 82 and achieve the same results. The positioning of gas valve member 80 is influenced by the size and pressures acting upon a closing hydraulic surface 81, which is exposed to gas pressure in the hollow piston cavity 11, bias hydraulic surface 82 which is always exposed to the high fluid pressure in high pressure reservoir 28 via a biasing hydraulic cavity 136, and the opening hydraulic surface 83 that may be exposed to high or low pressure in flow passage 69a via a control hydraulic cavity 134 depending upon the positioning of flow control valve 60. These surfaces and pressures are preferably sized such that gas valve member 80 will remain in a closed position when pressures in the hollow piston cavity 11 are high, such as during compression or combustion, even though fluid pressures in branch fluid flow passage 69a acting on opening hydraulic surface 83 may also be high. In other words, these surfaces and pressures are preferably sized such that gas valve member 80 can only be moved to an open position when pressures in hollow piston cavity 11 are relatively low. Thus, intensifier piston 110 will be the only part driven downward during an injection event because pressures in the hollow piston cavity 11 are relatively high such that gas exchange valve member 80 is held closed and any high pressure fluid from flow control valve 60 is channeled into branch flow fluid flow passage 69b.

Turning now to FIGS. 1, 6, 9, and especially 5, the various components that make up the port control system 120 according to the preferred embodiment of the present invention are illustrated. The port control system shares several components in common with the previously described fuel pressurization and gas exchange system 100 illustrated in FIG. 4. These items include the sharing of the same main control valve 50 and spool control valve 60 as well as the respective sources of high and low fluid pressure 28 and 30. Thus, these portions of port control system 120 will not be re-described. In this subsystem, the port control valve 70 is operably coupled to the main control valve 50 via the PCV pilot valve 90 and the spool flow control valve 60, both of which are controlled in their positioning by the pressure existing in control passage 58, and its respective branch passages 58a and b. Port control valve 70 is normally hydraulically biased downward toward an exhaust position in which the intake passage is closed, by constant high pressure acting on a bias hydraulic surface 72. This constant high pressure is supplied from high pressure reservoir 28 via supply branch passages 29e and 29f. Port control valve 70 can be moved upward toward its intake position, where the exhaust passage is blocked, when hydraulic pressure acting on control hydraulic surface 71 is high. Those skilled in the art will appreciate that the biasing direction of port control valve 70 could be reversed and some other biaser, such as a spring, could be substituted for the hydraulic biasing described in the preferred embodiment.

In this embodiment, pressure in a control flow passage 75, which acts upon control hydraulic surface 71, can only be high when a pilot valve member 91 of PCV pilot valve 90 is moved to a downward position as shown in FIGS. 6 and 9. When in such a position, an annulus 93 directly connects control flow passage 75 to the high pressure reservoir 28 via high pressure supply branch passages 29, 29e and 29g. Pilot valve member 91 is normally biased upward to a position shown in FIG. 5 that closes annulus 93 by a constant high pressure acting on biasing hydraulic surface 98. This high pressure is again provided by high pressure reservoir 28 via supply branch passages 29, 29e, and 29g. Nevertheless, those skilled in the art will appreciate that some other biaser, such as a spring, could be substituted for the hydraulic biasing means described. In addition to biasing hydraulic surface 98, pilot valve member 91 includes a control hydraulic surface 94 that is exposed to fluid pressure in branch control passage 58b, and a top hydraulic surface 95 which is fluidly connected to branch passage 69c of actuation fluid flow passage 69. It is important to note that, in this preferred embodiment, only an inner portion of top hydraulic surface 95, corresponding to a reduced area 96, is exposed to the fluid pressure in branch fluid flow branch passage 69c when pilot valve member 91 is in its upward position as shown in FIG. 5; however, the complete top hydraulic surface 95, which corresponds to enlarged area 97, is exposed to fluid pressure in fluid flow branch passage 69c when pilot valve member 91 moves downward away from its upward position, as shown in FIGS. 6 and 9. In order to isolate port control system 120 during an injection event, fluid flow branch passage 69c is blocked by gas exchange valve member 80 when the same is in its upward closed position.

The various surfaces, biasing forces and fluid pressures relating to PCV pilot valve 90 are chosen such that pilot valve member 91 will be biased upward to the position shown in FIG. 5 whenever the pressure in branch fluid flow passage 69c is low due to the positioning of spool flow control valve 60. These various features are also preferably chosen such that pilot valve member 91 is biased to remain in its upward position when pressure in branch fluid passage 69c is high but the pressure in branch control passage 58b is low, which as described is determined by the positioning of main control valve 50. These various surfaces and pressures are preferably also chosen such that pilot valve member 91 will only be biased downward away from its upward position when pressure in fluid flow branch passage 69c and branch control passage 58b are both high, by an appropriate positioning of both main control valve 50 and spool flow control valve 60. Once pilot valve member 91 moves away from seat 19 (FIG. 9) to expose the complete top hydraulic surface 95 to pressure in fluid flow branch passage 69c, it becomes biased toward a downward position where annulus 93 can be opened. Thus, provided that high pressure exists in branch flow passage 69c, pilot valve member 91 can be moved toward its downward position by only briefly opening branch control passage 58b to high pressure via main control valve 50.

Referring briefly, and specifically to FIG. 9, the preferred structure of pilot valve member 91 is such that its biasing hydraulic surface 98 is positioned within its hollow interior and is always exposed to high pressure in branch supply passage 29g via a plurality of slots in member 91. Also, as with the other valves that make up the overall invention, each valve can be considered to have its own valve body. And each valve member can be thought of and the associated flow passages can be thought of as being positioned in the valve body, such as PCV pilot valve 90 including valve body 92. When pilot valve member 91 is in its upward position shown in FIG. 5, control flow passage 75 can drain to drain passage 31d via annulus 93.

INDUSTRIAL APPLICABILITY

Figure 2B:
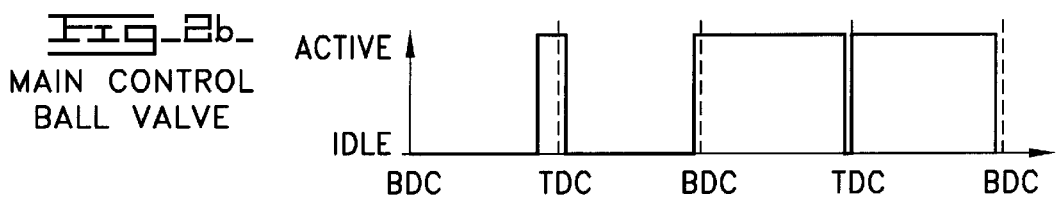
Figure 2C:
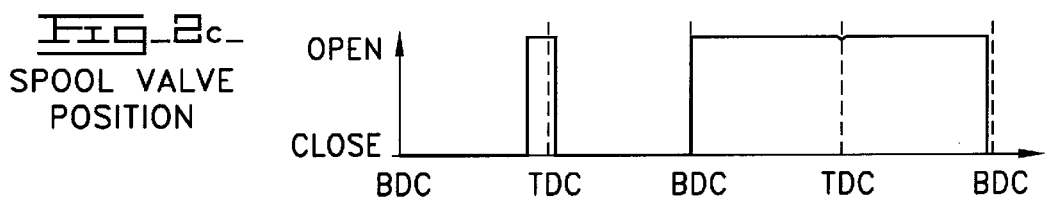
Figure 2D:
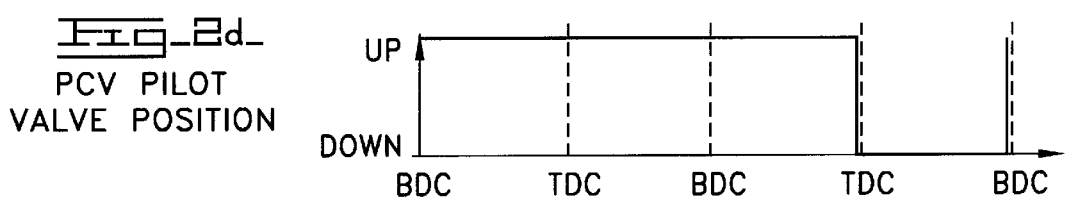
Figure 2E:
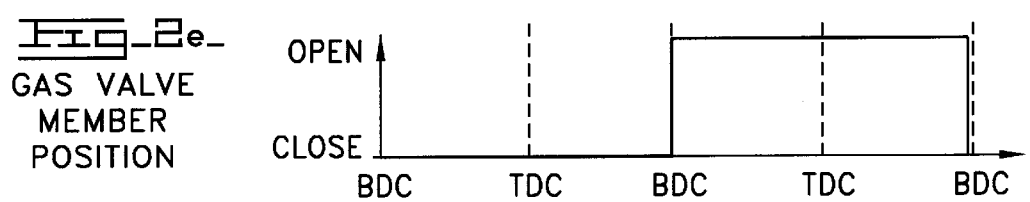
Figure 2F:
Figure 2G:
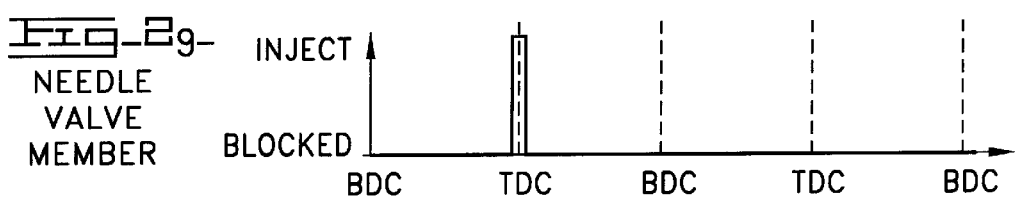

Referring now to all the drawings, but primarily FIG. 6 and the graphs of FIGS. 2a–2g, the functioning of the present invention for a single example engine cycle will be described. FIGS. 2a–2g show various key components of the preferred embodiment graphed versus piston position for one complete engine cycle (4 cycle), where the piston reciprocates twice between bottom dead center and top dead center. Nevertheless, those skilled in the art will appreciate that none of the features graphed against the piston position is actually a function of the same. Instead, the various features are graphed against piston position to better illustrate generally where the various events such as injection, intake and exhaust occur relative to one another in a typical 4 cycle engine cycle.

The various graphs of FIGS. 2a–2g begin with the piston at bottom dead center and moving upward during the compression stroke of the engine. At the beginning point, both electrical actuators 41, 51 for the MonoValve fuel injector 20 are de-energized such that both the needle control ball 44 and the main control ball 54 are pressure biased to their respective low pressure seats. When in this position, needle valve member 140 is held in its downward closed position because its closing hydraulic surface 49 is acted upon by high pressure in control passage 48 (See FIG. 3). FIGS. 4 and 5 are useful in illustrating that when main control valve 50 is in its de-energized position, high pressure exists in control passage 58, which keeps spool flow control valve 60 in its closed position. Even though high pressure exists in control passage 58, since spool flow control valve 60 is in its closed position, PCV pilot valve 90 remains biased towards its upward position because of the low pressure existing in actuation fluid flow passage 69. This low pressure in flow passage 69 also results in gas valve member 80 being biased toward its upward closed position. Likewise, port control valve 70 is pressure biased to its downward exhaust position because of the low pressure existing in control flow passage 75 due to the positioning of PCV pilot valve 90. Also during this time, intensifier piston 110 is retracted to its upward position and fuel pressure within the MonoValve fuel injector 20 is low.

As piston 12 moves upward, the air within hollow piston cavity 11 is compressed. This compressed air in turn acts upon closing hydraulic surface 81 of gas valve member 80 to further hold it in its upward closed position. As piston 12 continues upward toward its top dead center position, main control ball valve 50 is activated by energizing solenoid 51. This drives ball valve member 54 downward to close high pressure seat 56 and open low pressure seat 57. This in turn causes pressure in control passage 58 to become low and relieves the previously high pressure acting upon end hydraulic surface 63 of spool flow control valve 60. This in turn causes spool valve member 62 to move downward against the action of its biasing spring 64 to an open position in which fluid flow passage 69 is opened to high pressure supply line 29. Because pressure in control passage 58 is now low, PCV pilot valve 90 remains in its upward position. Because of the relatively high compression pressure in hollow piston cavity 11, gas valve member 80 remains pushed upward toward its closed position. This results in high pressure in flow passage 69 acting upon the top hydraulic surface 111 of intensifier piston 110 to drive the same downward to compress fuel within the fuel pressurization chamber 113 of MonoValve injector 20. When this occurs, fuel pressures within the MonoValve injector 20 quickly rise to relatively high injection pressures. However, because needle control ball valve 40 is still in its de-energized position, high pressure continues to act on the closing hydraulic pressure surface 49 of needle valve member 140 to hold it in its downward blocked position. As the piston 12 continues moving up near its top dead center position, it becomes time to perform the fuel injection.

When it is time to inject fuel, the second electrical actuator 41 is energized to drive ball valve member 44 downward to close high pressure seat 46 and open low pressure seat 47. This relieves the high pressure acting on the closing hydraulic surface 49 and allows needle valve member 140 to lift to its upward inject position that allows high pressure fuel to enter hollow piston cavity 11 via nozzle outlet 45. Shortly before the desired amount of fuel has been injected, actuator 41 is de-energized, which allows ball valve member 44 to be hydraulically moved back to close low pressure seat 47 and reopen high pressure seat 46. Those skilled in the art will appreciate that direct control needle valve 40 also has the ability to rate shape and produce split injections. The re-pressurization of control passage 48 acts upon closing hydraulic surface 49 to move needle valve member 140 downward to its blocked position to close nozzle outlets 45 and end the injection event. Shortly thereafter, the first actuator 51 for main control valve 50 is de-energized to allow ball valve member 54 to hydraulically move upward to close low pressure seat 57 and reopen high pressure seat 56. This in turn causes pressure in control passage 58 to return to a high pressure acting upon end hydraulic surface 63 of spool valve member 62. Spool valve member 62 then becomes hydraulically balanced and its biasing spring 64 moves it upward to a position that connects flow control passage 69 to low pressure drain 31c. Shortly after the injection event ends, the power stroke portion of the engine begins as the compressed fuel air mixture ignites and pushes piston 12 downward toward its bottom dead center position.

Toward the end of the power stroke, as the piston 12 approaches its bottom dead center position, it becomes time to open the gas valve member 80 to allow exhaust gases to escape hollow piston cavity 11. This is initially accomplished by again energizing solenoid 51 to move main control ball valve 54 from its low pressure seat 57 to close high pressure seat 56. This in turn allows spool flow control valve 60 to move to its upward open position in which flow passage 69 is again connected to high pressure supply line 29. Because the gas pressure now acting on the bottom closing hydraulic surface 81 of gas valve member 80 is relatively low, the high pressure in control hydraulic cavity 134 acts on opening hydraulic surface 83 to move gas valve member 80 downward to its open position. This movement enables the port control system 120 by unblocking passage 69c. Because solenoid 41 remains de-energized at this time, high pressure in passage 48 holds needle valve member 140 in its closed position. This closure of nozzle outlet 45 causes intensifier piston 110 to be hydraulically locked and stationary, due in part to the fluid forces on the opposing hydraulic surfaces of the pressure intensifying pumping element, despite the high pressure present in flow passage 69b. As piston 12 moves upward from its bottom dead center position toward its top dead center position, exhaust gases are pushed out of cavity 11, past seat 16 into radial exhaust openings 73, and into exhaust passage 15.

When piston 12 nears its top dead center position, it becomes time to switch the port control valve 70 to its intake position. This is accomplished by briefly de-energizing solenoid 51 so that ball valve member 54 quickly moves to close low pressure seat 57 and reopen high pressure seat 56. When this occurs, spool valve member 62 begins to slowly move toward its closed position. However, because of the mass properties and other engineering factors, spool valve member 62 is preferably intended to be rather sluggish in its movement when compared to the ball valve member 54 of the main control valve 50. Thus, for a brief period, high pressure exists in both control passage 58b and in flow passage 69c, which causes PCV pilot valve member 91 to move toward its downward position to open annulus 93 to the high pressure source. Main control valve 50 need only be de-energized for a brief period of time since PCV pilot valve member 91 will be biased toward its downward position once it moves off of its upward position due to the now high pressure acting on the larger hydraulic surface area 97. When PCV pilot valve member 91 moves to its downward position, annulus 93 becomes open, and high pressure fluid pours into control flow passage 75 to act upon control hydraulic surface 71 to move port control valve 70 upward to its intake position at which exhaust passage 15 is blocked but intake passage 14 is open.

Next, piston 12 begins moving downward from its top dead center position toward its bottom dead center position and brings fresh air into hollow piston cavity 11. It is important to note that because spool valve member 62 is preferably relatively sluggish in its performance relative to that of ball valve member 54, it is unable to move far enough to close the connection between high pressure line 29c and flow passage 69 during the energized stage used to initiate PVC motion. As piston 12 approaches its bottom dead center position, it becomes time to close gas valve member 80 in preparation for the next compression stroke. This is accomplished by again de-energizing solenoid 51 so that main control ball valve member 54 moves back to close low pressure seat 57 and reopen high pressure seat 56. When this is done, spool valve member 62 becomes hydraulically balanced and begins moving back to a position that connects flow passage 69 to the low pressure source 30. When that occurs, PCV pilot valve member 90 returns to its upward position and gas valve member 80 returns to its biased upward closed position. At about the same time, port control valve member 70 moves back downward to its normal biased exhaust position. The overall system is now ready to commence a subsequent engine cycle.

The present invention allows a valve member to be assembled into a valve body or other housing where the valve body must have two larger diameter portions which surround a smaller diameter opening in the housing. While the present invention has been illustrated for use with a MonoValve assembly, it should be appreciated that it can find application in the assembly of any hydraulic gas exchange valve requiring the dimensions described above. When used with the MonoValve assembly illustrated herein, the ring not only allows for proper assembly of the MonoValve, but it can also be used to hydraulically slow down the gas valve member and reduce impact forces exerted on various surfaces of the same during engine operation. In this manner, the ring can help increase the life of the gas valve member.

Because the various key events in the engine cycle occur at different times, the present invention has the ability to control fuel injection, intake and exhaust through the use of only two electrical actuators. Furthermore, all of these events are electronically controlled and thus can be performed, to some extent, independent of the engine crank shaft position. Not only does the design of the present invention permit these various functions to be performed through electronic control, but the various processes are done more efficiently since the exchange of gases can take place through a single relatively large opening positioned directly in the center at the top of the hollow piston cavity 11. This contrasts with prior designs in which two exhaust valves must compete for space with two separate intake valves and a centrally located fuel injector.

The MonoValve fuel injection system of the present invention is believed to provide a number of subtle but important benefits. For instance, better air exchange can be accomplished with the use of a single mono valve rather than having to rely upon four individual gas exchange valves distributed around a centrally located fuel injector. This system also has a robust design because there is no possible positioning of the gas exchange valve member that could come into contact with the moving piston This permits a "free-wheeling" design that avoids possible catastrophic engine failure due to valve/piston contact. Engines according to the present invention are also believed to be more robust since no material bridges are needed in the engine head as in the case where four valves surround a centrally located fuel injector. The present invention also increases injection flexibility capabilities by having a separate direct control needle that is controlled by a single electrical actuator. The present invention also can permit variable valve timing to improve performance and provide the possibility of varied operating cycles, such as the Miller cycle. Finally, the present invention can improve robustness and reduce cost by reducing the overall part count from that of its multiple valve and fuel injector counterparts.

It should be understood that the above description is intended for illustrative purposes only, and is not intended to limit the scope of the present invention in any way. For instance, while the retainer has been illustrated as a clip with a rectangular cross section, it should be appreciated that other cross section shapes, such as a circular cross section, are possible. Additionally, while the retainer and ring have been illustrated for use with a MonoValve, it should be appreciated that the present invention could be used on any hydraulic gas exchange valve in which the valve body must have a relatively large diameter portion on both ends of a relatively small diameter bore in the valve body component. Thus, those skilled in the art will appreciate the various modifications could be made to the disclosed embodiments without departing from the intended scope of the present invention, which is defined in terms of the claims set forth below.

What is claimed is:

1. A gas exchange valve for an engine, comprising:
a hollow valve piece having a stem portion and a valve portion, and said valve portion defining a nozzle outlet and including an annular valve surface;
at least a portion of a fuel injector with a pressure intensifying pumping element positioned in said hollow valve piece;
a ring mounted around and in contact with said stem portion; and
a retainer positioned between said stem portion and said ring.

2. The gas exchange valve of claim 1 wherein at least one of said ring, said valve piece and said retainer define an opening hydraulic surface; and
at least one of said ring, said valve piece and said retainer define a biasing hydraulic surface oriented in opposition to said opening hydraulic surface.

3. The gas exchange valve of claim 2 wherein substantially all of said biasing hydraulic surface is a surface of said ring.

4. The gas exchange valve of claim 2 wherein a majority of said opening hydraulic surface is a surface of said stem portion.

5. The gas exchange valve of claim 2 wherein said opening hydraulic surface has a greater effective area than said biasing hydraulic surface.

6. The gas exchange valve of claim 2 wherein said ring is press fit mounted on said stem portion;
at least one of said ring and said stem portion defines a groove; and
said retainer is at least partially positioned in said groove.

7. A monovalve fuel injector comprising:
an injector body including a hollow gas exchange valve piece having a stem portion and a valve portion, and said valve portion defining a nozzle outlet and including an annular valve surface;
a ring mounted around and in contact with said stem portion;
a retainer positioned between said stem portion and said ring; and
a pressure intensifying pumping element at least partially positioned inside said hollow valve piece and including opposing hydraulic surfaces.

8. The monovalve fuel injector of claim 7 further comprising a direct control needle valve at least partially positioned in said hollow valve piece.

9. The monovalve fuel injector of claim 7 wherein at least one of said ring, said valve piece and said retainer define an opening hydraulic surface; and
at least one of said ring, said valve piece and said retainer define a biasing hydraulic surface oriented in opposition to said opening hydraulic surface.

10. The monovalve fuel injector of claim 9 wherein substantially all of said biasing hydraulic surface is a portion of said ring.

11. The monovalve fuel injector of claim 10 wherein a majority of said opening hydraulic surface is a surface of said stem portion.

12. The monovalve fuel injector of claim 11 wherein said opening hydraulic surface has a greater effective area than said biasing hydraulic surface.

13. The monovalve fuel injector of claim 7 further comprising a hollow port control valve member surrounding a portion of said valve piece.

14. An engine comprising:
a housing defining a hollow piston cavity separated from a gas passage by a valve seat, and further defining a biasing hydraulic cavity and a control hydraulic cavity;
a gas valve member movable relative to said valve seat between an open position at which said hollow piston cavity is open to said gas passage, and a closed position at which said hollow piston cavity is blocked from said gas passage, and said gas valve member including a ring mounted on a valve piece, and a retainer positioned between said ring and said valve piece;

at least a portion of a fuel injector with a pressure intensifying pumping element being positioned inside said gas valve member;

said gas valve member having a closing hydraulic surface exposed to liquid pressure in said biasing hydraulic cavity, and an opening hydraulic surface exposed to liquid pressure in said control hydraulic cavity; and wherein said opening hydraulic surface has a larger effective area than said closing hydraulic surface.

15. The engine of claim 14 wherein a majority of said closing hydraulic surface is a surface of said ring.

16. The engine of claim 15 wherein substantially all of said closing hydraulic surface is said surface of said ring.

17. The engine of claim 14 wherein said valve piece has an end, and a portion of said opening hydraulic surface is said end.

18. The engine of claim 14 further comprising a source of high pressure liquid fluidly connected to said biasing hydraulic cavity.

19. The engine of claim 18 further comprising an electronically actuated control valve and a low pressure reservoir; and said control valve having a first position at which said control hydraulic cavity is fluidly connected to said source of high pressure liquid, and a second position at which said control hydraulic cavity is fluidly connected to said low pressure reservoir.

20. The engine of claim 14 wherein said valve piece has an end, and a portion of said opening hydraulic surface is said end;

said engine also including a source of high pressure, an electronically actuated control valve and a low pressure reservoir; and said control valve having a first position at which said control hydraulic cavity is fluidly connected to said source of high pressure liquid, and a second position at which said control hydraulic cavity is fluidly connected to said low pressure reservoir.

* * * * *